(12) United States Patent
Earnshaw et al.

(10) Patent No.: US 7,296,217 B1
(45) Date of Patent: Nov. 13, 2007

(54) ELECTRONIC TRANSACTION DOCUMENT SYSTEM

(75) Inventors: Dennis G. Earnshaw, Tualatin, OR (US); Dennis J. Stejskal, Portland, OR (US); Daniel R Corpron, Portland, OR (US); John G. Ritzenthaler, Jr., Lafayette, CO (US)

(73) Assignee: Timberline Software Corporation, Beaverton, OR (US)

( * ) Notice: Subject to any disclaimer, the term of this patent is extended or adjusted under 35 U.S.C. 154(b) by 0 days.

(21) Appl. No.: 09/566,842

(22) Filed: May 5, 2000

(51) Int. Cl.
*G06F 17/00* (2006.01)

(52) U.S. Cl. .............. 715/500.1; 715/526; 715/730; 715/751; 709/206; 709/203

(58) Field of Classification Search ............ 715/513, 715/522, 501.1, 507, 526, 730, 751, 500.1; 345/1, 619, 621, 624, 731, 760; 709/206, 709/203
See application file for complete search history.

(56) References Cited

U.S. PATENT DOCUMENTS

| | | | | |
|---|---|---|---|---|
| 5,652,876 | A * | 7/1997 | Ashe et al. ............ | 703/26 |
| 6,012,071 | A * | 1/2000 | Krishna et al. .......... | 715/522 |
| 6,092,105 | A * | 7/2000 | Goldman ............... | 709/217 |
| 6,185,684 | B1 * | 2/2001 | Pravetz et al. .......... | 713/182 |
| 6,256,668 | B1 * | 7/2001 | Slivka et al. ........... | 709/220 |
| 6,347,398 | B1 * | 2/2002 | Parthasarathy et al. ... | 717/178 |
| 6,546,554 | B1 * | 4/2003 | Schmidt et al. ......... | 717/176 |
| 6,591,260 | B1 * | 7/2003 | Schwarzhoff et al. .... | 707/2 |
| 6,601,087 | B1 * | 7/2003 | Zhu et al. .............. | 709/205 |
| 6,606,654 | B1 * | 8/2003 | Borman et al. ......... | 709/219 |
| 6,785,867 | B2 * | 8/2004 | Shaffer et al. .......... | 715/516 |
| 6,907,452 | B1 * | 6/2005 | Malik .................. | 709/206 |

OTHER PUBLICATIONS

Mark R. Brown, Special Edition Using Netscape 3, Que Corporation, Copyright 1996, pp. 246-255.*

* cited by examiner

*Primary Examiner*—Stephen Hong
*Assistant Examiner*—Matthew J. Ludwig
(74) *Attorney, Agent, or Firm*—Greenberg Traurig LLP; Bradley D. Blanche (57) ABSTRACT

The present invention includes an electronic business transaction method for conducting a business transaction over a computer network. The method includes creating on an originating computer an electronic business transaction document that is compatible with a business management software program capable of automatically populating and extracting information from electronic business transaction document. The electronic business transaction document is transmitted over the computer network to an intended recipient computer. Also, a determination is made as to whether the intended recipient computer is capable of viewing the electronic business transaction document. If it is determined that the intended recipient computer is not capable of viewing the electronic business transaction document, a viewer application or access to it is transmitted to the recipient computer with the electronic business transaction document. The viewer application is not capable of automatically populating and extracting information from electronic business transaction document.

53 Claims, 6 Drawing Sheets

**TIMBERLINE
electrical**

5000 Volt Avenue
Portland, Oregon 97124

Phone: (503) 555-1212
Fax: (503) 555-1213

REQUEST FOR INFORMATION (RFI)

To:________________________________Date:________

Company:__________________________Fax:_________

Address:___________________________RFI#:________

Applicable Ref:__________________________Spec. Section:_______

Contract DWG:_____________________

RE:_______________________________

Subject____________________________

Question(s):________________________

Fig. 5

ELECTRONIC TRANSACTION DOCUMENT SYSTEM

FIELD OF THE INVENTION

This invention relates to business-to-business electronic commerce and, in particular, to conducting such electronic commerce with the precondition of universal adoption of an electronic commerce standard.

BACKGROUND AND SUMMARY OF THE INVENTION

Business-to-business electronic commerce has long promised significant improvements in the speed, accuracy, and efficiency with which transactions between businesses can be conducted. In industries such as construction, for example, a project may entail tens of thousands transactions relating to acquisition of building materials, sub-contractor services, cost allocations, etc. In the conventional manual manner of conducting such transactions, suppliers and contractors each require staff who interpret and manually enter transaction information that is received as a printed transaction documents via mail or telephonic facsimile. Business-to-business electronic commerce has offered the promise of transmitting such transaction information electronically, thereby decreasing the cost and errors that can arise in conventional manual processing of transaction documents.

One type of business-to-business electronic commerce is called electronic data interchange (EDI). Two well-known standards for EDI are the ANSI X12 standard, promulgated by the American National Standards Institute, and UN/EDIFACT, an international standard used especially widely in Western Europe. A limitation on the implementation of business-to-business electronic commerce has been the requirement that both parties to a transaction adopt a common business-to-business electronic commerce system or protocol. In practice, that means that every supplier, contractor, vendor, etc. in the industry must adopt the same standard. The expense, time, and cooperation required to implement for such an industry-wide standard can be significant.

The present invention includes an electronic business transaction method for conducting a business transaction over a computer network. The method includes creating on an originating computer an electronic business transaction document that is compatible with a business management software program capable of automatically populating and extracting information from electronic business transaction document. The electronic business transaction document is transmitted over the computer network to an intended recipient computer.

Also, a determination is made as to whether the intended recipient computer is capable of viewing the electronic business transaction document. If it is determined that the intended recipient computer is not capable of viewing the electronic business transaction document, a viewer application or access to it is transmitted to the recipient computer with the electronic business transaction document. The viewer application allows the user to interact with documents (i.e., manually create, modify and view them), but does not otherwise perform business management processes. In one implementation, the viewer allows users to select data from lists (e.g., contacts and job numbers) as well as track sent and received documents.

In one implementation, the method includes transmitting the electronic business transaction document directly to the intended recipient computer, for example as an e-mail attachment. In another implementation, the method includes transmitting the electronic business transaction document to an intermediary server computer that forwards the electronic business transaction document to the intended recipient computer.

The electronic business transaction method of the present invention allows the operator of a computer with business management software to transmit electronic business transaction documents to effect business-to-business electronic commerce transactions regardless of whether the receiving computer includes the business management software, or even a viewer to open electronic business transaction document. As a result, electronic business transaction method of the present invention allows business-to-business electronic commerce to be initiated if only one party has the business management software. This overcomes the typical limitation in business-to-business electronic commerce, which requires that virtually all parties to a project adopt and implement a common electronic commerce software standard.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
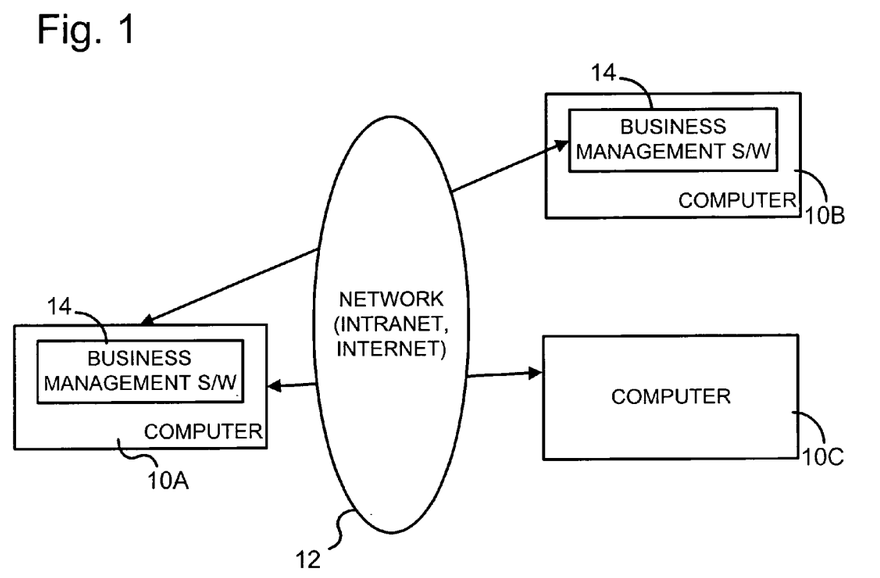
FIG. 1 is a block diagram illustrating a computer network architecture as one operating environment for the present invention.

FIG. 1 is a block diagram illustrating a computer network architecture as one operating environment for the present invention. Multiple computers 10 are in communication with each other via a network 12, such as a LAN, WAN, an intranet, or the Internet. Each of computers 10 has, for example, a conventional computer configuration that may include a high speed processing unit (CPU) in conjunction with a memory system (with volatile and/or non-volatile memory), an input device, and an output device, as is known in the art. Electronic mail, called e-mail, is one way in which communications may be transmitted between computers 10. E-mail may be conducted in accordance with a variety of standards or formats, as is known in the art.

Computers 10 are described as each being operated by a different contractor, supplier, vendor, etc. that is associated with a business project. For purposes of illustration, the business project is described as being a construction project, and the contractors, suppliers, vendors, etc. operating computers 10 are associated with the construction industry and provide, offer, or request goods or services for the construction project.

In addition to each of them including e-mail software and services (not shown), two of computers 10 (designated computers 10A and 10B) further include business management software 14 for managing various aspects of a business project, including communications and transactions with business parties such as contractors, suppliers, vendors, etc., transaction and other project accounting, overall project management, etc. With regard to the exemplary construction industry, for example, business management software 14 is available from Timberline Software Corporation of Beaverton, Oreg., the assignee of the present invention, as well as others.

Figure 2:
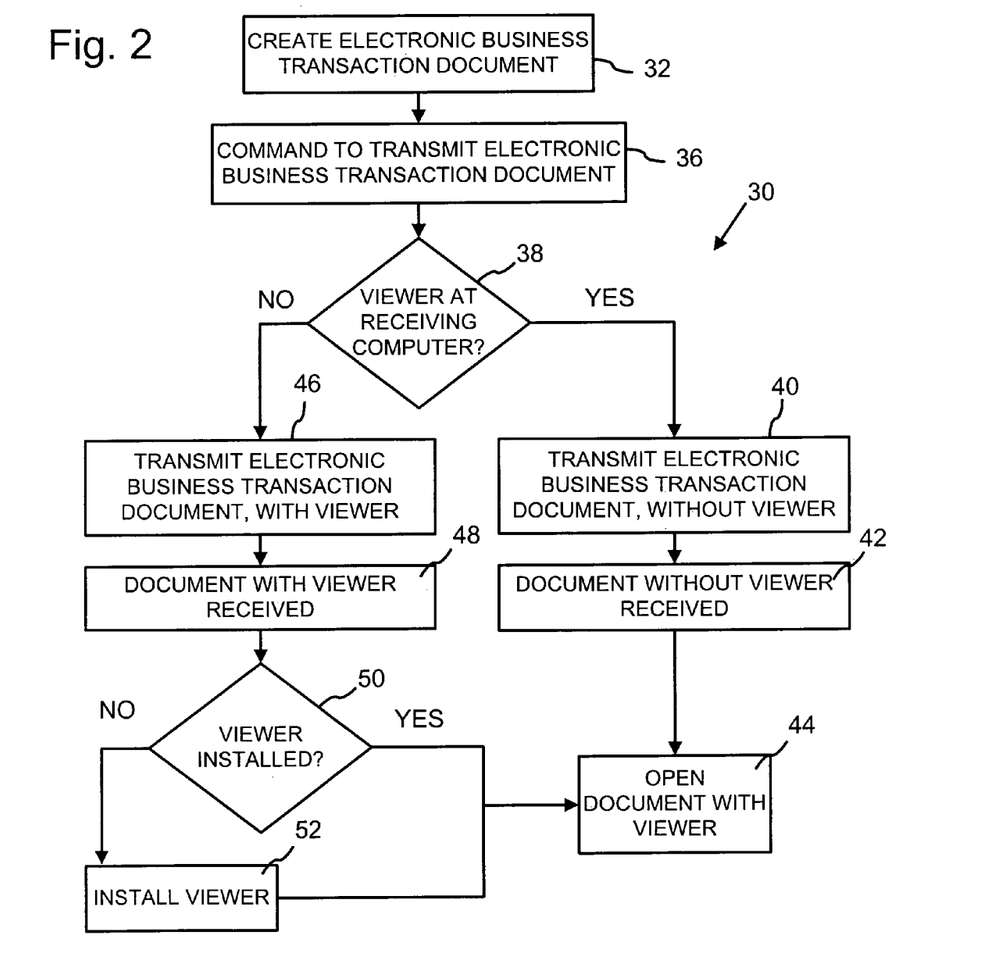
FIG. 2 is a flow diagram illustrating an originating electronic transaction document transmission method.

FIG. 2 is a flow diagram illustrating an originating electronic transaction document transmission method 30 for conducting business-to-business electronic commerce according to the present invention. In one implementation, originating electronic transaction document method 30 is performed at least in part by software elements that are included in or associated with business management software 14.

Figure 3:
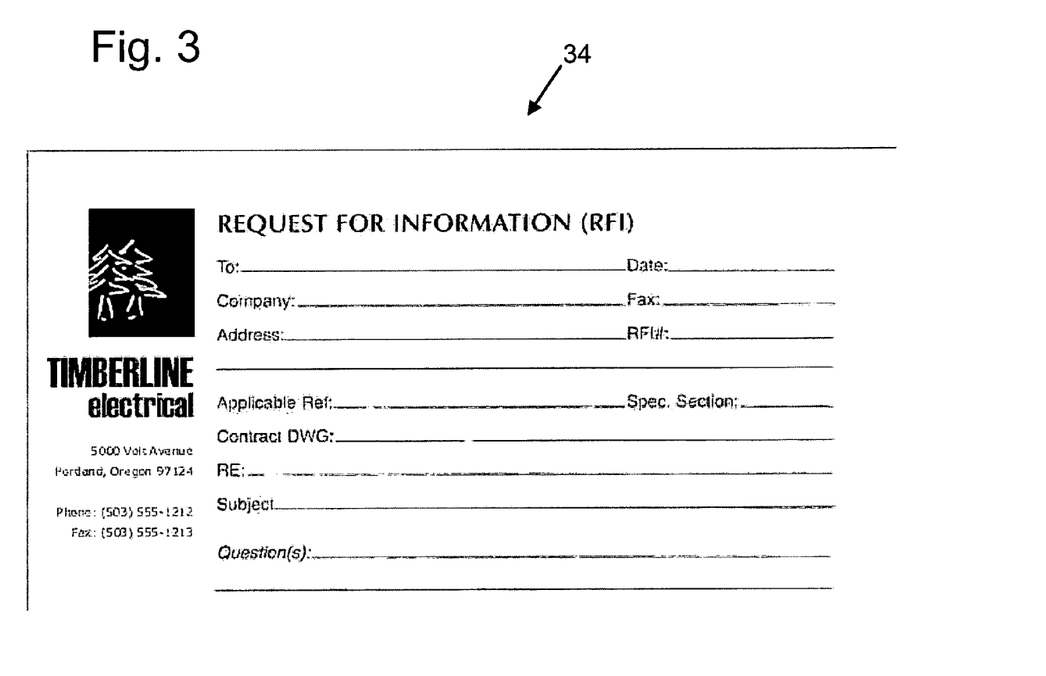
FIG. 3 is a diagram of an exemplary electronic business transaction document.

Process block 32 indicates that an electronic business transaction document is created on computer 10A with business management software 14, or a component of it, to effect a business-to-business electronic commerce transaction. In one implementation, the electronic business transaction document may include one or more of the following:

Request for Quote
Quote
Purchase Order
Subcontract
Accounts Payable Invoice
Accounts Receivable Invoice In other implementations, the electronic business transaction document may additionally or alternatively include one or more of the following:

Bulletins
Change Orders
Change Order Logs
Change Order Requests
Change Order Request Logs
Daily Reports
Drawing Logs
Estimates
Forecasts
Owner Manuals Logs
Meeting Minutes
Contacts
Contracts
Project Setup Sheets
Punch Lists
Purchase Order Change Orders
Quote Logs
Requests For Information
Request For Information Logs
Subcontract Change Orders
Submittal Logs
Work Orders
Work Order Logs
Transmittals
Field Work Authorizations/Field Change Orders
Leases
Tenant Statements
Safety Notices
Pay applications/Draw Requests
Project log
Material delivery receipt
Material delivery receipt log
Timecards
Repair orders
Daily report log
Proposal
Report
Sent & Received log FIG. 3 is a diagram of an exemplary electronic business transaction document 34 in the form of a purchase order relating to a construction project. The following description refers to electronic business transaction document 34 for purposes of illustration, but is similarly applicable to any of the electronic business transaction documents.

Process block 36 indicates that a transmit command is issued to transmit electronic business transaction document 34 to one or more selected recipient computers 10B and 10C (only one of each shown). The transmit command may be generated manually by the operator of computer 10A or may generated automatically as by computer 10A based upon a pre-defined schedule or another pre-defined criterion. In one implementation, the transmit command causes electronic business transaction document 34 to be transmitted to another computer 10 as a file attachment to an e-mail message. It will be appreciated that transmission of electronic business transaction document 34 to one or more selected recipient computers (e.g., computers 10B or 10C) may be directed in particular to the operator of the recipient computer or the organization or business with which the operator is associated (e.g., as an employee). References herein to information (e.g., electronic business transaction document 34) being transmitted to a computer are interchangeable with the information being transmitted to an operator of the computer or the organization or business with which the operator is associated.

In one implementation, electronic business transaction document 34 is represented as a markup language computer file (e.g., an EXtensible Markup Language (XML) computer file) and may include other files (e.g., graphics, scripts, etc.) or links to them. An example of an XML computer file for another electronic business transaction document is set forth in Table 1. Electronic business transaction document 34 includes two identifiers: a form identifier ("FormID," designated TS_FORM in Table 1) that determines how the XML data are to be viewed/presented, and data identifier ("DataID," designated TS_DOC in Table 1) that uniquely identifies the data in the document. The combination of the DataID and FormID completely determine the format of and data in electronic business transaction document 34.

TABLE 1

```
<TS_SmartDoc xmlns="urn:www-Timberline-
com\schema\PMDocument\SmartDoc.xml">
<TS_FORM>TMBS-
65D57381EF9511D3BD5B0090278C7BDA</TS_FO
RM>
<TS_DOC Author="Fred Jones"
Date="5/1/2000">TMBS-
C07CE5EA81DB45EA84F69995FA577B11</TS_DO
C>
<Receiver receiver_type=" ">abc@xyz.com</Receiver>
<DocData RecordSet="RFQ">
  <row RFQID="1" QSSummaryID="1"
  Status="Received" ContactID="14"
  CurrencySetupID="1" DocObjectID="1"
  Lump="False" OperatorID="wendyh"
  RecordTimestamp="1999-12-31T00:00:00" />
</DocData>
<DocData RecordSet="QSArchitect">
```

TABLE 1-continued

```
    <row CompanyName="Anderson Electric"
      Address1="6172 NE Romex St." City="Junction
      City" State="OR" Zip="97401"
      Phone1="5039034823" />
    </DocData>
    <DocData RecordSet="QSProject">
      <row PrjName="Timberline Addition"
      PrjAddress1="51595 NW Greenbrier Parkway"
      PrjCity="Beaverton" PrjState="OR"
      PrjZip="97006" ArchitectID="1" />
    </DocData>
</TS_SmartDoc>
```

In the illustrated implementation, the form identifier functions to identify the document form, type or template (e.g., a request for information adapted for a particular business entity, as shown in FIG. 3) upon which electronic business transaction document 34 is based. The data identifier functions to identify the data that populates the document form, type or template. The document form, type or template corresponding to the form identifier and the data corresponding to the data identifier are accessible from at least one computer on network 12. It will be appreciated that the computer on network 12 identified in the data source field may be computer 10A from which electronic business transaction document 34 is to be transmitted, or may be another computer on network 12.

Inquiry block 38 represents an inquiry as to whether a viewer application or applet adapted for viewing electronic business transaction documents 34 is available at the selected recipient computer (e.g., computers 10B or 10C). In one implementation, the availability of viewer application or applet adapted for viewing electronic business transaction document 34 may be determined according to whether the application or applet had been previously transmitted or otherwise made available (e.g., with a hyperlink) to computers 10B or 10C based upon a transmission from computer 10A. Whenever an electronic transaction document viewer application is available at the selected recipient computer, inquiry block 38 proceeds to process block 40. Whenever an electronic transaction document viewer application is not available at the selected recipient computer, inquiry block 38 proceeds to process block 46.

Process block 40 indicates that electronic business transaction document 34 is transmitted as a file attached to an e-mail directed to the selected recipient computer (e.g., computer 10C), but without a copy of or other access to the electronic transaction document viewer application being included in the e-mail. For example, electronic business transaction document 34 is transmitted as a self-extracting file attachment, in a manner known in the art.

Process block 42 indicates that the e-mail and the attached electronic business transaction document 34 are received at the selected recipient.

Process block 44 indicates that an operator of computer 10C opens the electronic transaction document with the viewer application. In one implementation, opening the electronic transaction document e-mail attachment launches an extraction program that extracts the XML data to a temporary location, call our document viewer and hand the data to the viewer.

Process block 46 indicates that electronic business transaction document 34 is transmitted as a file attached to an e-mail directed to computer 10C, for example, together with a copy of or other access to electronic transaction document viewer application (e.g., a link) being included with the e-mail. For example, electronic business transaction document 34 and a copy of the viewer application are transmitted as separate self-extracting file attachments, in a manner known in the art. As another example, access to electronic business transaction document 34 and a copy of the viewer application are transmitted as links to a network-connected computer or server.

Process block 48 indicates that the e-mail and the attached electronic business transaction document 34 and a copy of or other access to the electronic transaction document viewer application are received at computer 10C.

Inquiry block 50 represents an inquiry as to whether the selected recipient computer (e.g., computer 10C) has installed on it the electronic transaction document viewer application. In some instances, the electronic transaction document viewer application could have been previously installed from an e-mail attachment sent from a computer that is different than computer 10A and has business management software 14. In other instances, the electronic transaction document viewer application could have been previously installed as a part of business management software 14, as on computer 10B. The inquiry of block 50 may be performed as a check of the operating system registry of the selected recipient computer during the extraction and installation of the electronic transaction document viewer application. Whenever the recipient computer does not have installed on it the electronic transaction document viewer application, inquiry block 50 proceeds to process block 52. Whenever the recipient computer has installed on it the electronic transaction document viewer application, inquiry block 50 proceeds to process block 44.

Process block 52 indicates that the electronic transaction document viewer application is installed on the recipient computer.

Originating electronic transaction document transmission method 30 allows the operator of computer 10A with business management software 14 to transmit electronic business transaction document 34 to effect business-to-business electronic commerce regardless of whether the receiving computer (e.g., computer 10C) includes business management software 14 or even a viewer to open electronic business transaction document 34. As a result, originating electronic transaction document transmission method 30 allows business-to-business electronic commerce to be initiated if only one party (e.g., the operator of computer 10A) has business management software 14. This overcomes the typical limitation in business-to-business electronic commerce, which requires that virtually all parties to a project adopt and implement a common electronic commerce software standard.

In the illustrated originating electronic transaction document transmission method 30, one implementation of inquiry block 38 includes determining the availability of viewer application or applet at recipient computers 10B or 10C according to whether the application or applet had been previously transmitted or otherwise made available from computer 10A. It will be appreciated that this determination could happen at different points in the process, or not at all. As an example of another implementation, activating or opening an electronic business transaction document at a recipient computer could automatically access the viewer application or applet if already installed or, if not, make a call to a server computer for installation of the viewer.

Figure 4:
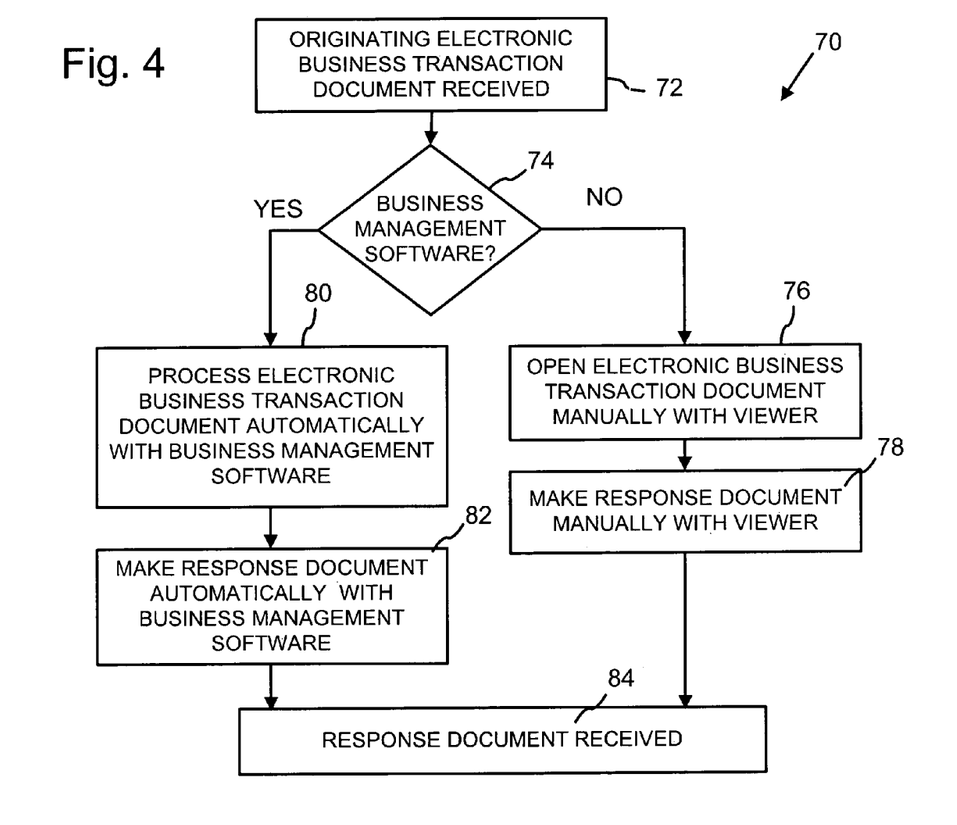
FIG. 4 is a flow diagram illustrating a responding electronic transaction document transmission method.

FIG. 4 is a flow diagram illustrating a responding electronic transaction document transmission method 70 for conducting business-to-business electronic commerce according to the present invention. Some aspects of responding electronic transaction document method 70 may be performed at least in part by software elements that are included in or associated with business management software 14.

Process block 72 indicates that an originating electronic transaction document (e.g., document 34) is received at a computer 10.

Inquiry block 74 represents an inquiry as to whether the computer 10 receiving an originating electronic transaction document (e.g., document 34) has available thereon business management software that is compatible with, or the same as, business management software 14 that generated the originating electronic transaction document 34. Whenever the computer 10 receiving originating electronic transaction document 34 does not have available thereon business management software that is compatible with or the same as business management software 14 (e.g., computer 10C), inquiry block 74 proceeds to process block 76. Whenever the computer 10 receiving originating electronic transaction document 34 has available thereon business management software that is compatible with or the same as business management software 14 (e.g., computer 10B), inquiry block 74 proceeds to process block 80.

Process block 76 indicates that originating electronic transaction document 34 is opened with an electronic transaction document viewer application. For example, the electronic transaction document viewer application may have been transmitted with the originating electronic transaction document 34 as an e-mail attachment, or may have previously been transmitted to and installed on the computer. The electronic transaction document viewer application differs from business management software 14 in that the former will not include the same range of functionality for communications and transactions with business parties such as contractors, suppliers, vendors, etc., transaction and other project accounting, overall project management, etc. In one implementation, the electronic transaction document viewer application may perform any number of the following functions:

New—allows the user to select a blank form from which to create a new document.

Save—saves the document in an XML file and creates an entry in the 'Sent and Received Log'

Print—prints the document.

Cut—moves the current selection to the Windows clipboard.

Copy—copies the selected text to the Windows clipboard.

Paste—copies the contents of the Windows clipboard to the control in focus.

Delete—deletes the document.

Insert Hyperlink—allows the users to create a link to some other document or object.

Attach—displays a list of electronic transaction documents and system files. One or more electronic objects can be attached to a document.

Undo—reverses an action.

Format Font—allows the user to control the style, size, color, etc. of the current selection.

Format Paragraph—allows the user to determine line spacing, indentation, the use of bullets, etc.

Send—allows the document to be emailed, faxed or printed.

View—allows the user to switch between Page and Screen view

Help—provides user assistance.

The electronic transaction document viewer application allows the operator of computer 10C, for example, to perform any of the listed functions with regard to the originating electronic transaction document 34, or with regard to other electronic transaction documents. As a result, the operator of computer 10C may manually process the originating electronic transaction document 34 according to normal business management practices of that business.

Process block 78 indicates that the operator of computer 10C responds to the operator of computer 10A by transmitting thereto an electronic transaction document that is compatible with business management software 14. Typically, the responding electronic transaction document would be created and completed with the electronic transaction document viewer application and manual data entry by the computer operator. The responding electronic transaction document would be transmitted to computer 10A as an e-mail attachment, but could alternatively be sent by telephonic facsimile or mail, for example.

Process block 80 indicates that the electronic transaction business transaction document is received and processed automatically by business management software 14 on, for example, computer 10B. In one implementation, business management software 14 retrieves information from the electronic transaction business transaction document automatically without manual data manipulation by the computer operator. In this instance, with both the transmitting and receiving computers 10 having business management software 14, both the respective business entities obtain the full benefit and automation of an electronic business transaction.

Process block 82 indicates that the operator of computer 10B responds to the operator of computer 10A by transmitting thereto an electronic transaction document that is compatible with business management software 14. Typically, the responding electronic transaction document would be created and completed with automatic data entry or minimal manual data entry into the responding electronic transaction document provided by business management software 14. In one implementation, the responding electronic transaction document would be transmitted to computer 10A as an e-mail attachment.

Process block 84 indicates that computer 10A receives the responding electronic transaction document. As an e-mail attachment, for example, the responding electronic transaction business transaction document is received and processed automatically by business management software 14 on computer 10A. Business management software 14 retrieves information from the responding electronic transaction business transaction document and passes the information to appropriate portions and fields therein automatically without manual data entry by the computer operator.

Responding electronic transaction document transmission method 70 allows originating computer 10A to receive and process responding electronic transaction business transaction documents without regard to whether the responding entity operates business management software 14. In particular, responding electronic transaction business transaction documents generated automatically from business management software 14 (e.g., on computer 10B) or with the electronic transaction document viewer application and manual data entry by the computer operator (e.g., on computer 10C) may be indistinguishable at originating computer 10A.

Figure 5:
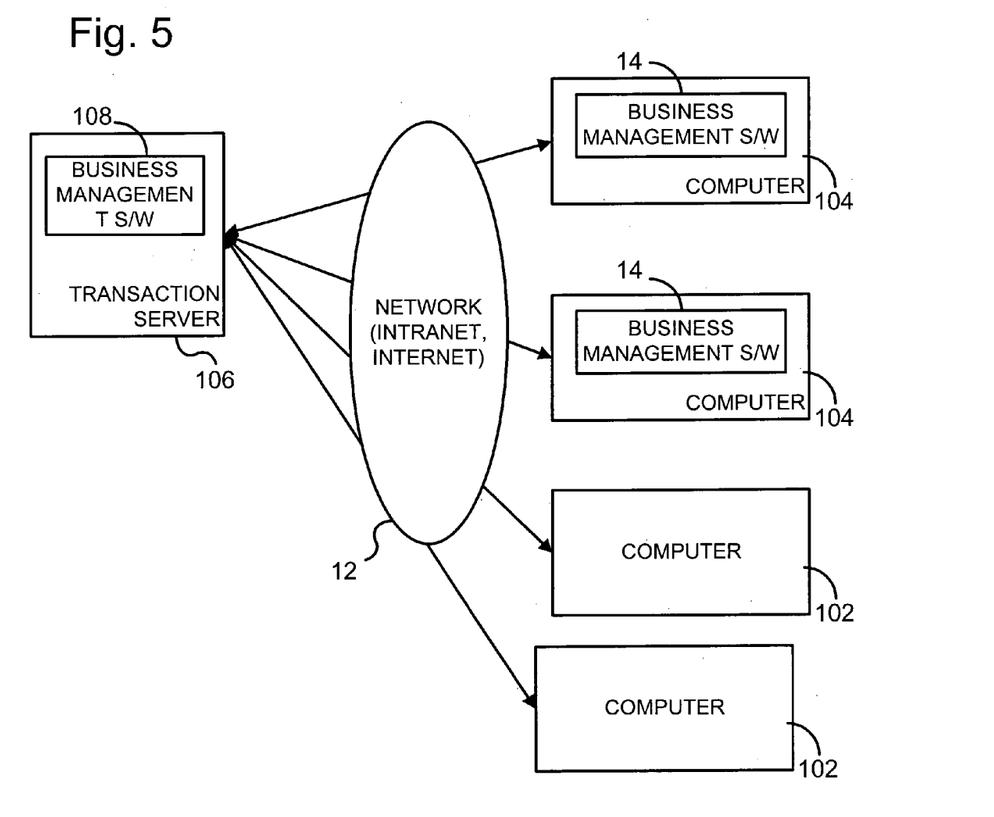
FIG. 5 is a block diagram illustrating a computer network architecture as another operating environment for the present invention.

FIG. 5 is a block diagram illustrating a computer network architecture of computer network 12 with operation characterized as multiple client computers 102 and 104 communicating with a transaction server computer 106. In an exemplary implementation, each of client computers 102 and 104 is a personal computer running commercially available network browser software (not shown), such as Netscape Navigator from Netscape Corporation or Internet Explorer from Microsoft Corporation, or other network file transfer/viewing software.

Server 106 is a computer that provides services or information to client computers 102 and 104. Server 106 runs network server software that coordinates communications with client computers 102 and 104. For a=example, information may be transferred between client computers 102 and 104 and server 106 as mark-up language program files and can include text, a programs, graphics, video, and audio portions, as is known in the art.

In addition, client computers 104 further include business management software 14 for managing various aspects of a business project, including communications and transactions with business parties such as contractors, suppliers, vendors, etc., transaction and other project accounting, overall project management, etc. With regard to the exemplary construction industry, some types of business management software 14 are available from Timberline Software Corporation of Beaverton, Oreg., the assignee of the present invention. Server computer 106 also operates a server version 108 of business management software.

Figure 6:
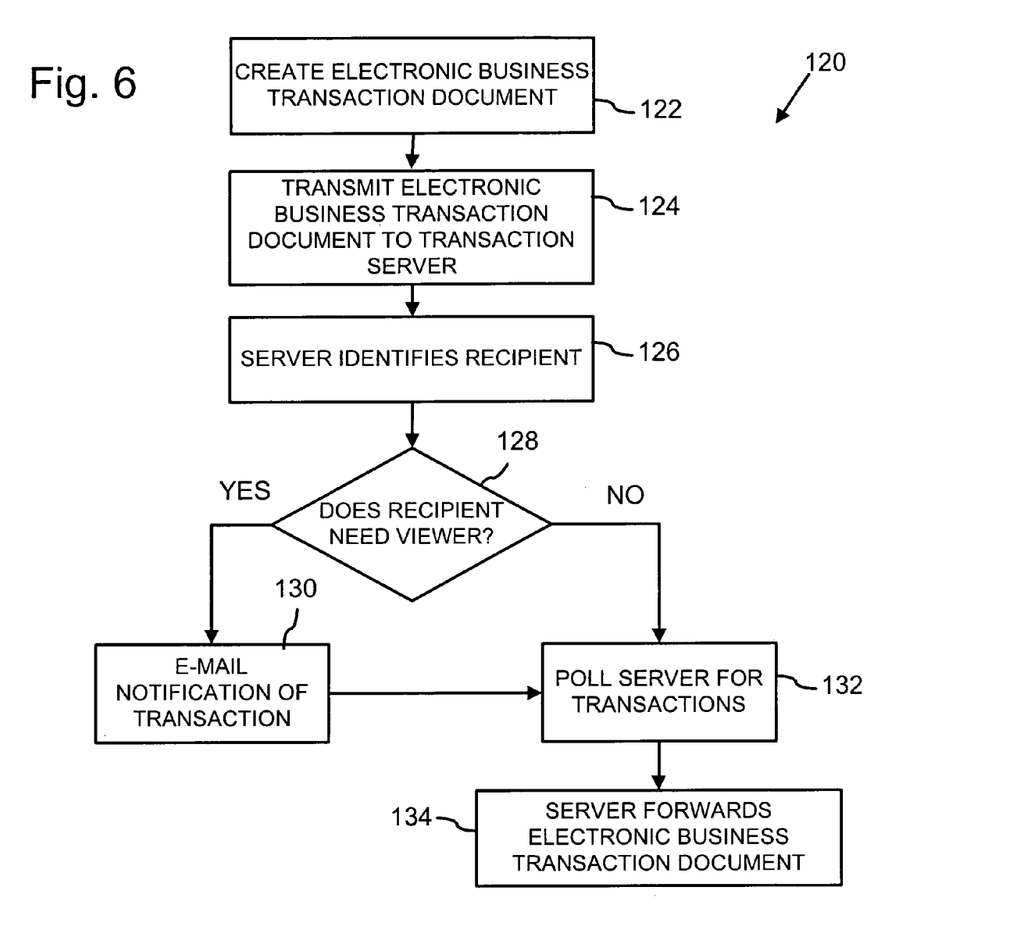
FIG. 6 is a flow diagram illustrating another electronic transaction document transmission method.

FIG. 6 is a flow diagram illustrating an electronic transaction document transmission method 120 for conducting business-to-business electronic commerce according to the present invention. In electronic transaction document transmission method 30 (FIG. 2), electronic transaction documents are transmitted directly between the parties to a transaction in a client-to-client manner. In electronic transaction document transmission method 120, electronic transaction documents are transmitted to and forwarded from server computer 106, which functions as an intermediary in the transactions.

Process block 122 indicates that an electronic business transaction document is created on a computer with business management software 14 (e.g., computer 104), or a component of it (e.g., computer 102 with a viewer application), to effect a business-to-business electronic commerce. The electronic business transaction document may include or have associated with it an indication of whether the document is to be directed to a particular party or broadcast to numerous parties.

Process block 124 indicates that the electronic business transaction document is transmitted over network 12 to server computer 106. Server computer 106 functions as a portal for receiving electronic business transaction documents and directing them to specifically named parties or classes of unnamed parties, as specified for or in the document. The electronic business transaction document may be transmitted as a file attached to an e-mail address associated with server computer 106 or may be transmitted in accordance with the HyperText Transfer Protocol (HTTP), File Transfer Protocol (FTP), or in some other network file transfer format. In one implementation, the electronic business transaction document is represented as a markup language computer file (e.g., an EXtensible Markup Language (XML)) and may include other associated files (e.g., graphics, scripts, etc.), as illustrated in Table 1. Process block 126 indicates that server version 108 of business management software on server 106 identifies the intended recipient or recipients of the electronic business transaction document. For example, the one or more intended recipients may be specifically identified or identified as a class or group by a "receiver" tag in the electronic business transaction document, as illustrated in Table 1. To simplify the following description, only one intended recipient shall be referred to.

Inquiry block 128 represents an inquiry whether the intended recipient needs the document viewer application. Alternatively, the inquiry could be whether the intended recipient has the document viewer application. The inquiry may be made, for example, by server version 108 of business management software on server 106. If the intended recipient needs the document viewer application. inquiry block 128 proceeds to process block 130. If the intended recipient does not need the document viewer application. inquiry block 128 proceeds to process block 132.

Process block 130 indicates that an email message is sent to the intended recipient containing a notification that there is a waiting transaction. The email contains a link to an installation program at the server 106 for installing the document viewing application. If the intended recipient's client computer does not have it, the document viewing application may be installed upon activation of the link.

Process block 132 business management software 14 or the document viewing application on the intended recipient's client computer will poll the business management software on server 106 to determine if transactions are waiting to be transported to them. For example, the business management software on server 106 may be polled at a user-specified frequency. In addition or alternatively, the intended recipient may selectively receive a 'notification' email from server 106 informing the recipient of the waiting transaction or transactions. This notification email could contain a link or attachment to initiate the business management software or the document viewing application and the transaction transport capabilities contained within them.

Process block 134 indicates that server version 108 of business management software on server 106 forwards the electronic business transaction document to the intended recipient or recipients.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

The invention claimed is:

1. An electronic business transaction method for conducting a business transaction over a computer network, comprising:
   creating on a first computer an electronic business transaction document that is compatible with a business management software program that automatically populates and extracts information from the electronic business transaction document;
   determining at the first computer whether the second computer to which the electronic business transaction document is to be transmitted has a software program that views the electronic business transaction document, wherein the determination is performed by the first computer;

if the first computer determines that the second computer has the software program that views the electronic business transaction document, transmitting from the first computer the electronic business transaction document over the computer network to the second computer; and if the first computer determines that the second computer does not have the software program that views the electronic business transaction document, transmitting from the first computer a viewer application, which does not automatically populate or extract information from the electronic business transaction document, to the second computer with the electronic business transaction document.

2. The method of claim 1 in which transmitting the electronic business transaction document to the second computer includes transmitting the electronic business transaction document directly to an address associated with the second computer.

3. The method of claim 1 in which determining whether the second computer has the viewer application includes determining if it had been previously sent to the second computer from the first computer.

4. The method of claim 1 in which transmitting the electronic business transaction document to the second computer includes transmitting the electronic business transaction document directly to an address associated with a network-connected server computer, which forwards the electronic business transaction document to the second computer.

5. The method of claim 4 in which determining whether the second computer has the software program to view the electronic business transaction document includes determining if the viewer application had been previously sent to the second computer from the network-connected server computer.

6. The method of claim 1 in which the electronic business transaction document includes a markup language computer file.

7. The method of claim 6 in which the markup language computer file includes Extensible Markup Language.

8. The method of claim 6 in which the markup language computer file includes a markup language form identifier that identifies an electronic business transaction document type for the electronic business transaction document.

9. The method of claim 6 in which the markup language computer file includes a markup language data identifier that identifies electronic business transaction document data for the electronic business transaction document.

10. The method of claim 1 in which the electronic business transaction document includes a form identifier that identifies an electronic business transaction document type for the electronic business transaction document and a data identifier that identifies electronic business transaction document data for the electronic business transaction document.

11. The method of claim 10 in which the electronic business transaction document is transmitted as a self-extracting file that is attached to an e-mail message.

12. The method of claim 1 in which the viewer application is transmitted as an attachment to an e-mail message.

13. The method of claim 12 in which the viewer application is transmitted as a self-extracting file that is attached to an e-mail message.

14. The method of claim 1 in which the electronic business transaction document is transmitted in accordance with a network transfer protocol.

15. The method of claim 1 in which the business transaction relates to a construction project.

16. In computer readable media, electronic business transaction software for conducting a business transaction over a computer network, comprising:

software for creating on a first computer an electronic business transaction document that is compatible with a business management software program that automatically populates and extracts information from the electronic business transaction document;

software for determining whether a second computer to which the electronic business transaction document is to be transmitted has a software program that views the electronic business transaction document;

software for transmitting the electronic business transaction document over the computer network to the second computer, if it is determined that the second computer has the software program that views the electronic business transaction document; and software for transmitting a viewer application, which does not automatically populate or extract information from the electronic business transaction document, to the second computer with the electronic business transaction document, if it is determined that the second computer does not have the software program that views the electronic business transaction document.

17. The media of claim 16 in which the software for transmitting the electronic business transaction document to the second, computer includes software for transmitting the electronic business transaction document directly to an address associated with the second computer.

18. The media of claim 16 in which the software for determining whether the second computer has the viewer application includes software for determining if the viewer application had been previously sent to the second computer from the first computer.

19. The media of claim 16 in which the software for transmitting the electronic business transaction document to the second computer includes software for transmitting the electronic business transaction document directly to an address associated with a network-connected server computer, which includes software for forwarding the electronic business transaction document to the second computer.

20. The media of claim 19 in which the software for determining whether the second computer has the software program to view the electronic business transaction document includes software for determining if the viewer application had been previously sent to the second computer from the network-connected server computer.

21. The media of claim 19 in which the software for determining whether a second computer to which the electronic business transaction document is to be transmitted has the software program to view the electronic business transaction document is a part of the network-connected server computer.

22. The media of claim 16 in which the software for determining whether a second computer to which the electronic business transaction document is to be transmitted has the software program to view the electronic business transaction document is a part of the first computer.

23. The media of claim 16 in which the electronic business transaction document includes a markup language computer file.

24. The media of claim 23 in which the markup language computer file includes Extensible Markup Language.

25. The media of claim 23 in which the markup language computer file includes a markup language form identifier that identifies an electronic business transaction document type for the electronic business transaction document.

26. The media of claim 23 in which the markup language computer file includes a markup language data identifier that identifies electronic business transaction document data for the electronic business transaction document.

27. The media of claim 16 in which the electronic business transaction document is transmitted as an attachment to an e-mail message.

28. The media of claim 27 in which the electronic business transaction document is transmitted as a self-extracting file that is attached to an e-mail message.

29. The media of claim 26 in which the viewer application is transmitted as an attachment to an e-mail message.

30. The media of claim 29 in which the viewer application is transmitted as a self-extracting file that is attached to an e-mail message.

31. The media of claim 16 in which the business transaction relates to a construction project.

32. The method of claim 1 in which the electronic business transaction document is transmitted as an attachment to an e-mail message.

33. An electronic business transaction method for conducting a business transaction over a computer network, comprising:
   creating on a first computer an electronic business transaction document that is compatible with a business management software program that automatically populates and extracts information from the electronic business transaction document;
   determining at the first computer whether the second computer to which the electronic business transaction document is to be transmitted has a software program that views the electronic business transaction document, wherein the determination is performed by the first computer;
   if the first computer determines that the second computer has the software program that views the electronic business transaction document, transmitting from the first computer the electronic business transaction document over the computer network to the second computer; and
   if the first computer determines that the second computer does not have the software program that views the electronic business transaction document, transmitting from the first computer a link to a viewer application to transmit the viewer application which does not automatically populate or extract information from the electronic business transaction document, to the second computer with the electronic business transaction document.

34. The method of claim 33 in which transmitting the electronic business transaction document to the second computer includes transmitting the electronic business transaction document directly to an address associated with the second computer.

35. The method of claim 33 in which determining whether the second computer has the viewer application includes determining if it had been previously sent to the second computer from the first computer.

36. The method of claim 33 in which transmitting the electronic business transaction document to the second computer includes transmitting the electronic business transaction document directly to an address associated with a network-connected server computer, which forwards the electronic business transaction document to the second computer.

37. The method of claim 36 in which determining whether the second computer has the software program to view the electronic business transaction document includes determining if the viewer application had been previously sent to the second computer from the network-connected server computer.

38. The method of claim 33 in which the electronic business transaction document includes a markup language computer file.

39. The method of claim 38 in which the markup language computer file includes Extensible Markup Language.

40. In computer readable media, electronic business transaction software for conducting a business transaction over a computer network, comprising:
   software for creating on a first computer an electronic business transaction document that is compatible with a business management software program that has a software program that automatically populates and extracts information from the electronic business transaction document;
   software for determining whether a second computer to which the electronic business transaction document is to be transmitted has a software program that views the electronic business transaction document;
   software for transmitting the electronic business transaction document over the computer network to the second computer, if it is determined that the second computer has the software program that views the electronic business transaction document; and
   software for transmitting a link to a viewer application, which does not automatically populate or extract information from the electronic business document, to transmit the viewer application viewer application to the second computer with the electronic business transaction document, if it is determined that the second computer does not have the software program that views the electronic business transaction document.

41. The media of claim 40 in which the software for transmitting the electronic business transaction document to the second, computer includes software for transmitting the electronic business transaction document directly to an address associated with the second computer.

42. The media of claim 40 in which the software for determining whether the second computer has the viewer application includes software for determining if the viewer application had been previously sent to the second computer from the first computer.

43. The media of claim 40 in which the software for transmitting the electronic business transaction document to the second computer includes software for transmitting the electronic business transaction document directly to an address associated with a network-connected server computer, which includes software for forwarding the electronic business transaction document to the second computer.

44. The media of claim 43 in which the software for determining whether a second computer to which the electronic business transaction document is to be transmitted has the software program to view the electronic business transaction document is a part of the network-connected server computer.

45. The media of claim 40 in which the electronic business transaction document includes a markup language computer file.

46. The media of claim 45 in which the markup language computer file includes Extensible Markup Language.

47. An electronic business transaction method for conducting a business transaction over a computer network, comprising:

receiving an electronic business transaction document at a transaction server, the electronic business transaction document being transmitted from a first computer and being created at the first computer utilizing a business management software program, wherein the business management software program is configured to automatically populate and extract information from the electronic business transaction document;

determining at the transaction server whether a second computer to which the electronic business transaction document is to be transmitted has a software program that views the electronic business transaction document;

if the transaction server determines that the second computer has the software program that views the electronic business transaction document, transmitting the electronic business transaction document over the computer network to the second computer; and     if the transaction server determines that the second computer does not have the software program that views the electronic business transaction document, transmitting a viewer application, which does not automatically populate or extract information from the electronic business transaction document, to the second computer with the electronic business transaction document.

48. The method of claim 47 in which determining at the transaction server whether a second computer to which the electronic business transaction document is to be transmitted has a software program that views the electronic business transaction document further comprises determining if the viewer application had been previously sent to the second computer from the first computer.

49. The method of claim 47 in which the electronic business transaction document includes a markup language computer file.

50. The method of claim 47 in which the markup language computer file includes Extensible Markup Language.

51. An electronic business transaction method for conducting a business transaction over a computer network, comprising:

creating on a first computer an electronic business transaction document that is compatible with a business management software program that automatically populates and extracts information from the electronic business transaction document;

establishing, at the first computer whether the second computer has a software program that views the electronic business transaction document by determining whether the viewer application had been previously sent from the first computer to the second computer;

if the first computer determines that the second computer has the software program that views the electronic business transaction document, transmitting from the first computer the electronic business transaction document over the computer network to the second computer; and     if the first computer determines that the second computer does not have the software program that views the electronic business transaction document, transmitting from the first computer a viewer application, which is different from a business management software program, to the second computer with the electronic business transaction document.

52. The method of claim 51 wherein the electronic business transaction document includes a markup language computer file.

53. The method of claim 51 in which wherein the markup language computer file includes Extensible Markup Language.

\* \* \* \* \*